United States Patent
Yamazaki et al.

(10) Patent No.: US 12,530,462 B2
(45) Date of Patent: Jan. 20, 2026

(54) ELECTRONIC CONTROL DEVICE AND SECURITY VERIFICATION METHOD FOR ELECTRONIC CONTROL DEVICE

(71) Applicant: Hitachi Astemo, Ltd., Hitachinaka (JP)

(72) Inventors: Hiroki Yamazaki, Ibaraki (JP); Shuhei Kaneko, Ibaraki (JP); Nobuyoshi Morita, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 385 days.

(21) Appl. No.: 17/423,271

(22) PCT Filed: Jan. 15, 2020

(86) PCT No.: PCT/JP2020/000950
§ 371 (c)(1),
(2) Date: Jul. 15, 2021

(87) PCT Pub. No.: WO2020/158377
PCT Pub. Date: Aug. 6, 2020

(65) Prior Publication Data
US 2022/0171855 A1    Jun. 2, 2022

(30) Foreign Application Priority Data
Jan. 30, 2019  (JP) .................................. 2019-013764

(51) Int. Cl.
*G06F 21/00* (2013.01)
*B60R 16/02* (2006.01)
(Continued)

(52) U.S. Cl.
CPC ............ *G06F 21/575* (2013.01); *B60R 16/02* (2013.01); *G06F 9/4418* (2013.01)

(58) Field of Classification Search
CPC .............................. G06F 9/4418; G06F 21/575
See application file for complete search history.

(56) References Cited

U.S. PATENT DOCUMENTS 9,575,768 B1 *   2/2017  Kim ...................... G06F 9/4401
2002/0156741 A1 * 10/2002  Furukawa .............. G06Q 30/06
                                                            705/52
(Continued)

FOREIGN PATENT DOCUMENTS

JP    2009-129322 A    6/2009
JP    2017-156945 A    9/2017
(Continued)

OTHER PUBLICATIONS

International Search Report, PCT/JP2020/000950, Jun. 2, 2020 (4 pgs.).

(Continued)

*Primary Examiner* — Rodman Alexander Mahmoudi
(74) *Attorney, Agent, or Firm* — Volpe Koenig

(57) ABSTRACT

The present invention provides a technology to ensure security during fast boot-up. Provided according to the present invention is an electronic control device installed on a mobile body, the electronic control device including a controller which controls a microcomputer using code, a security verifier which makes security verification of the code, and boot-up code which is part of the code and is executed when the microcomputer is booted. The controller enables, when the code or the boot-up code has been verified by the security verifier at the time of a transition of the microcomputer to a shutdown state, the boot-up code to be executed during next boot-up.

3 Claims, 5 Drawing Sheets

(51) Int. Cl.
　　　*G06F 9/4401*　　　(2018.01)
　　　*G06F 21/57*　　　(2013.01)

(56) References Cited

U.S. PATENT DOCUMENTS

| | | | |
|---|---|---|---|
| 2010/0257345 A1* | 10/2010 | Tazzari | G06F 8/654 |
| | | | 713/1 |
| 2013/0125244 A1 | 5/2013 | Sugano | |
| 2015/0074384 A1* | 3/2015 | Yajima | G06F 21/575 |
| | | | 713/2 |
| 2016/0366114 A1* | 12/2016 | Iizuka | H04L 63/0471 |
| 2017/0255384 A1* | 9/2017 | Hashimoto | G06F 3/061 |
| 2018/0096132 A1 | 4/2018 | Abe | |
| 2020/0074083 A1* | 3/2020 | Hou | G06F 11/1417 |

FOREIGN PATENT DOCUMENTS

| | | |
|---|---|---|
| JP | 2017-188826 A | 10/2017 |
| WO | 2016/185577 A1 | 11/2016 |

OTHER PUBLICATIONS

Extended European Search Report issued on Jul. 22, 2022 for European Patent Application No. 20748559.0.

\* cited by examiner

ELECTRONIC CONTROL DEVICE AND SECURITY VERIFICATION METHOD FOR ELECTRONIC CONTROL DEVICE

TECHNICAL FIELD

The present invention relates to an electronic control device and a security verification method for an electronic control device.

BACKGROUND ART

The recent development of safe driver-assistance and automated driving technology causes vehicles to be connected to an external system such as a server or a cloud. In order to ensure security inside and outside a vehicle, an in-vehicle device has a code verification function such as secure boot implemented therein.

PTL 1 discloses a secure boot method.

CITATION LIST

Patent Literature

PTL 1: JP 2017-188826 A

SUMMARY OF INVENTION

Technical Problem

In order to detect tampering with the code of the in-vehicle device, it is desirable that secure boot be executed during boot-up using a secure module such as a hardware security module (HSM) contained on the in-vehicle device.

On the other hand, an ECU which requires fast boot-up does not have enough time to execute the secure boot during boot-up and thus cannot execute a code verification process before code execution, so that security cannot be ensured. PTL 1, however, has no description of a method for ensuring security in a case where the code verification process cannot be executed.

The present invention has been made in order to solve the above-described problem, and it is therefore an object of the present invention to provide a technology to ensure security during fast boot-up.

Solution to Problem

In order to solve the above-described problem, an electronic control device according to the present invention, the electronic control device being installed on a mobile body, includes a controller which controls a microcomputer using code, a security verifier which makes security verification of the code, and boot-up code which is part of the code and is executed when the microcomputer is booted. The controller enables, when the code or the boot-up code has been verified by the security verifier at the time of a transition of the microcomputer to a shutdown state, the boot-up code to be executed during next boot-up.

Advantageous Effects of Invention

According to the present invention, it is possible to ensure security during fast boot-up.

DESCRIPTION OF EMBODIMENTS

Figure 1:
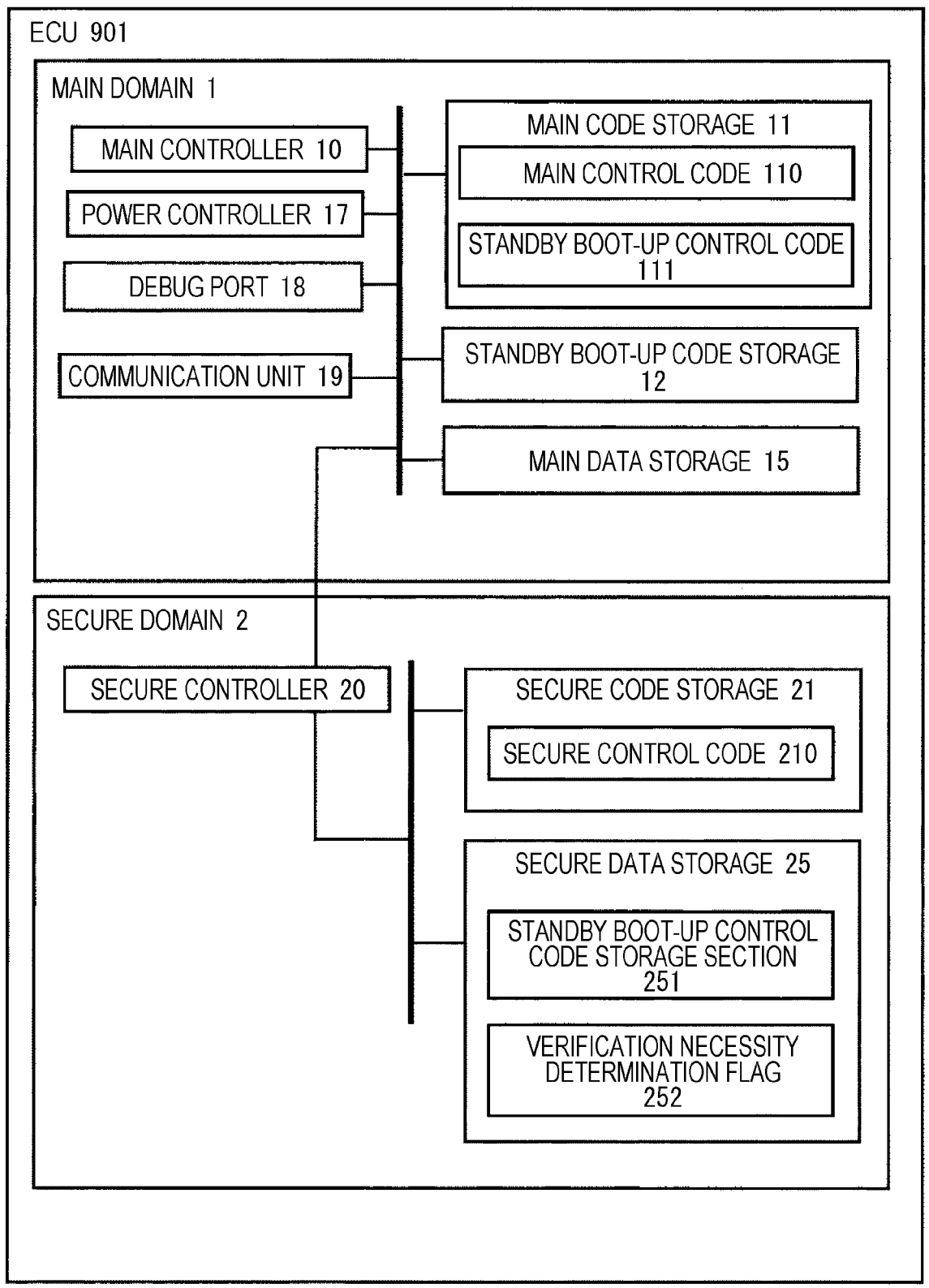
FIG. 1 is a block diagram of an ECU according to a first embodiment.

Hereinafter, a description will be given of some embodiments of the present invention with reference to the accompanying drawings. It should be noted that the present embodiment is merely an example for practicing the present invention and is not intended to limit the technical scope of the present invention. Components commonly shown in the drawings are denoted by the same reference numerals.

In the present embodiment, a description will be given of an example of an electronic control unit (ECU) which executes a code security verification (hereinafter, also referred to as secure boot) process.

First Embodiment

FIG. 1 is a block diagram showing an example of a structure of an ECU according to the first embodiment.

An ECU 901 includes a main controller 10, a main code storage 11, a standby boot-up code storage 12, a main data storage 15, a power controller 17, a debug port 18, and a communication unit 19 which are interconnected over a bus line. Further, a secure controller 20 to be described later is allowed to access the bus line. As opposed to a secure domain to be described later, a domain to which such components belong and connections between the components are referred to as a main domain 1 for the sake of convenience.

The ECU 901 further includes the secure controller 20, a secure code storage 21, and a secure data storage 25 which are interconnected over a bus line. A domain to which the secure controller 20, the secure code storage 21, and the secure data storage 25 belong and connections between the secure controller 20, the secure code storage 21, and the secure data storage 25 are referred to as a secure domain 2 for the sake of convenience. The main domain 1 is a part of the ECU 901 excluding the secure domain 2.

The bus line of the main domain 1 and the bus line of the secure domain 2 are not directly connected to each other from the viewpoint of ensuring security. Commands and data are transferred between both the domains 1, 2 via the secure controller 20.

The main controller 10 includes a processor (CPU, MPU, or DSP) and executes a program stored in the main code storage 11 or the standby boot-up code storage 12.

The main code storage 11 stores a program which is executed by the main controller 10. The main code storage 11 may be a non-volatile storage device such as a flash memory, an EEPROM, an SSD, an FRAM (registered trademark, the same applies hereinafter), or a magnetic disk. The main code storage 11 may include a plurality of storage devices, and each program may be stored in a distributed manner in the plurality of storage devices.

The standby boot-up code storage 12 stores a program which is executed by the main controller 10 during standby boot-up. The standby boot-up code storage 12 may be a memory including a RAM which is a volatile memory device. When the standby boot-up code storage 12 is made up of such a volatile memory device, the standby boot-up code storage 12 retains, in a standby state, values with power supplied with the power controller 17 to be described later. Alternatively, the standby boot-up code storage 12 may be a non-volatile storage device such as a flash memory, an EEPROM, an SSD, an FRAM, or a magnetic disk. The standby boot-up code storage 12 may include a plurality of storage devices, and each program may be stored in a distributed manner in the plurality of storage devices.

The main code storage 11, the standby boot-up code storage 12, and the main data storage 15 may be memories each including a ROM which is a non-volatile memory device and a RAM which is a volatile memory device. The ROM stores an invariable program. The RAM is a high-speed and volatile memory device such as a dynamic random access memory (DRAM) and stores, in a transitory manner, the program executed by the main controller 10 and data used during the execution of the program.

Note that the main code storage 11, the standby boot-up code storage, and the main data storage 15 may include some or all of their respective components. It may be assumed that, even with no clear distinction as a device, the main code storage 11 and the standby boot-up code storage each correspond a section where code is stored, and the main data storage 15 corresponds to a section where data is stored.

The main code storage 11 includes main control code 110 and standby boot-up control code 111. The main control code 110 is a program which is executed by the main controller 10 and enables the ECU 901 to act as an in-vehicle device. A plurality of main control codes 110 may be provided.

The standby boot-up control code 111 is a program which is executed by the main controller 10 to boot the ECU 901 from the standby state. The standby boot-up control code 111 is written, in a sequence to be described later, to the standby boot-up code storage 12 at a predetermined timing before the ECU 901 enters the standby state.

The main data storage 15 stores data which is used when the main controller 10 executes the program. The main data storage 15 may be a non-volatile storage device such as a flash memory, an EEPROM, an SSD, an FRAM, or a magnetic disk. The main data storage 15 may include a plurality of storage devices, and each piece of data may be stored in a distributed manner in the plurality of storage devices.

Although not clearly shown, the main data storage 15 includes control data. The control data of the main data storage 15 is data which is used for processing by the main control code 110 or the standby boot-up control code 111 executed by the main controller 10 and enables the ECU 901 to act as the in-vehicle device. A plurality of pieces of the control data of the main data storage 15 may be provided in accordance with uses.

The power controller 17 is a component from which the components of the ECU 901 are supplied with power. The power controller 17 supplies, on a one-by-one basis, power to each of the components in accordance with a state. Specifically, in the standby state, the power controller 17 is controlled to supply power to the standby boot-up code storage 12 but not to supply power with the main controller 10.

The debug port 18 is a module for use in rewriting of the code and data stored in the main code storage 11 or the main data storage from the outside of the ECU 901. The debug port 18 may be a JTAG interface, an SPI, or the like. The debug port 18 is intended to detect connection of a debugger or the like to reset the ECU 901 in cooperation with the power controller 17.

The communication unit 19 is a component for the ECU 901 to communicate with the other components of a vehicle 900. The communication unit 19 is a module for use in communication over CAN, CAN FD, Ethernet (registered trademark), or FlexRay. The ECU 901 may include a plurality of the communication units 19 in accordance with uses and communication systems. Furthermore, the communication unit 19 may be shared among modules for use in other communications. Note that the communication unit 19 may include an antenna and a modulation/demodulation circuit for radio communication. The communication unit 19 may include a connector and a modulation/demodulation circuit for wired communication.

The secure controller 20 includes an HSM, an SHE, a TPM, another type of secure microcomputer, or a processor (CPU, MPU, or DSP) called a secure core. The secure controller 20 executes a program stored in the secure code storage 21. The secure controller 20 may have tamper resistance. Note that the HSM, the SHE, or the TPM shown as an example of the secure controller 20 may include the secure code storage 21 and the secure data storage 25 to be described later.

The secure code storage 21 stores the program which is executed by the secure controller 20. The secure code storage 21 may be a non-volatile storage device such as a flash memory, an EEPROM, an SSD, an FRAM, or a magnetic disk. The secure code storage 21 may have tamper resistance. The secure code storage 21 may include a plurality of storage devices, and each program may be stored in a distributed manner in the plurality of storage devices.

The secure data storage 25 stores data which is used when the secure controller 20 executes the program. The secure data storage 25 may be a non-volatile storage device such as a flash memory, an EEPROM, an SSD, an FRAM, or a magnetic disk. The secure data storage 25 may have tamper resistance.

The secure code storage 21 and the secure data storage 25 may be memories each including a ROM which is a non-volatile memory device and a RAM which is a volatile memory device. The ROM stores an invariable program. The RAM is a high-speed and volatile memory device such as a dynamic random access memory (DRAM) and stores, in a transitory manner, the program executed by the secure controller 20 and data used during the execution of the program.

Further, the secure code storage 21 and the secure data storage 25 may include some or all of their respective components. It may be assumed that, even with no clear distinction as a device, the secure code storage 21 corresponds a section of the secure domain 2 where code is stored, and the secure data storage 25 correspond to a section of the secure domain 2 where data is stored.

The secure code storage 21 includes secure control code 210. The secure control code 210 is a program which is executed by the secure controller 20 and is provided for implementing a security function of the ECU 901 acting as the in-vehicle device. A plurality of secure control codes 210 may be provided. In a sequence to be described later, the secure control code 210 verifies the validity of the code of the ECU 901.

The secure data storage 25 includes a standby boot-up control code storage section 251 and a verification necessity determination flag. The standby boot-up control code storage section 251 is an area where the standby boot-up control code 111 is stored in a transitory or non-transitory manner and will be described in detail in a second embodiment to be described later. The verification necessity determination flag 252 is a flag for use in determination as to whether code verification by the secure controller 20 is necessary and will be described in detail in a third embodiment to be described later.

Further, the secure data storage 25 may retain secure control data which is used for processing by the secure control code 210 executed by the secure controller 20. The secure control data retained by the secure data storage 25 is data for use in implementation of the security function of the ECU 901 acting as the in-vehicle device, and a plurality of pieces of the secure control data may be provided in accordance with uses.

A description will be given below of an example of the security verification process with reference to FIGS. 2 and 3.

Figure 2:
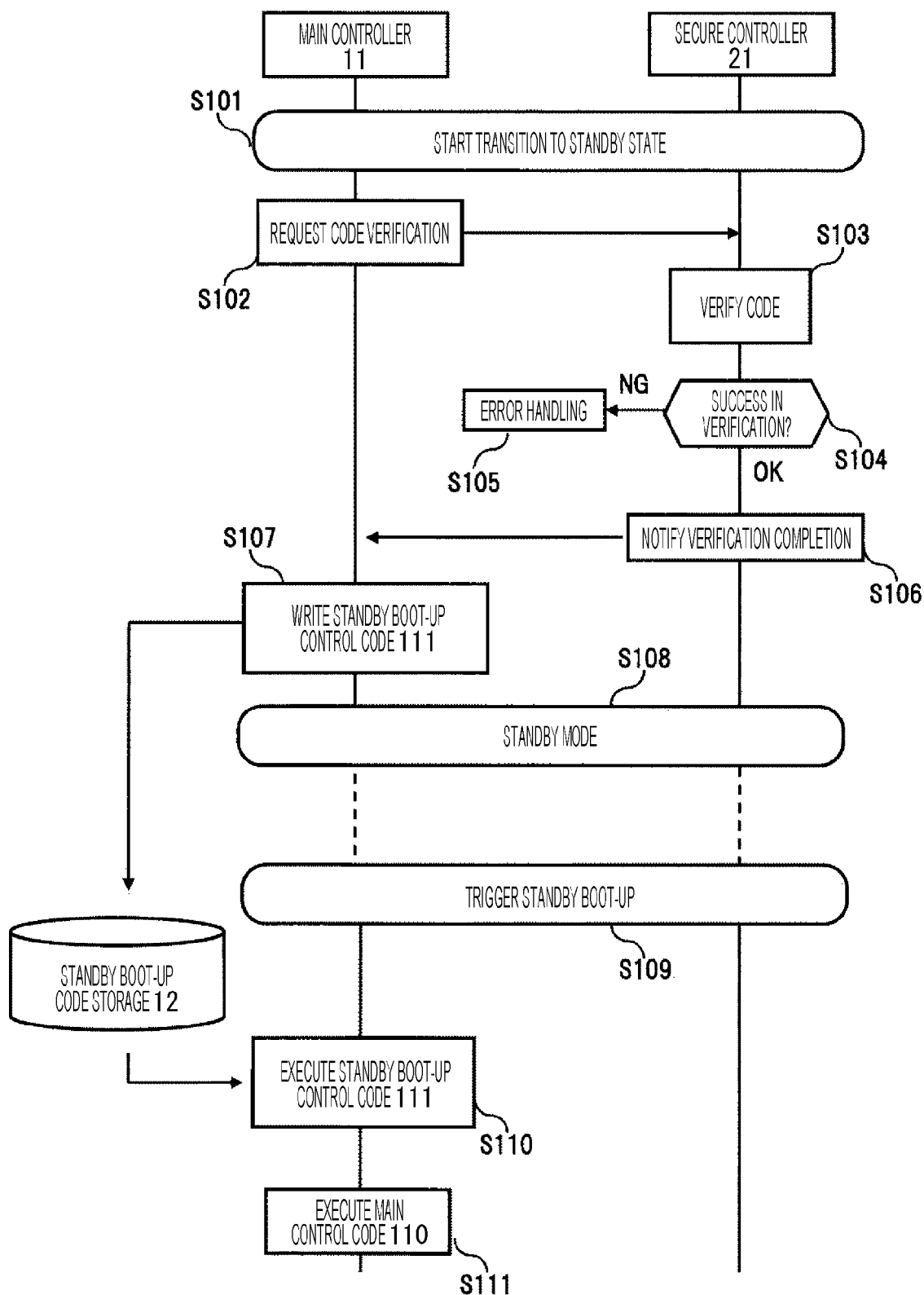
FIG. 2 is a flowchart of a security verification process according to the first embodiment.

FIG. 2 is a flowchart of the security verification process according to the first embodiment.

Hereinafter, it is assumed that, in a description of a case where the program stored in the main code storage 11 serves as an execution entity, the program is executed by the main controller 10. It is further assumed that, in a description of a case where the program stored in the secure code storage 21 serves as an execution entity, the program is executed by the secure controller 20.

Furthermore, arrows in FIG. 2 show conceptual command and data flows and are not intended to limit a communication direction or an instruction direction. There may be a processing instruction and a data flow which are not shown by the arrows.

The sequence shown in FIG. 2 starts from a state where the ECU 901 starts a transition to the standby state (S101). The transition of the ECU 901 to the standby state is triggered by stop of an engine, for example.

First, the main controller 11 requests the secure controller 21 to make code verification (S102). In response to the request, the secure controller 21 verifies the control code stored in the main code storage 11 (S103). S102 may be skipped, and when S102 is skipped, the secure controller 21 may execute S103 as a step subsequent to S101. Alternatively, the secure controller 21 may be driven by a timer to execute S103. When the code verification in S103 results in a failure (NO in S104), the secure controller 21 executes a predetermined error process (S105). When the code verification results in a success (YES in S104), the secure controller 21 notifies the main controller 11 of verification completion (S106). Upon receipt of the notification of the completion of successful code verification, the main controller 11 writes the standby boot-up control code 111 to the standby boot-up code storage 12 (S107) and enters the standby mode (S108).

Although not clearly shown in FIG. 2, in the standby mode, power is supplied from the power controller 17 to the standby boot-up code storage 12, thereby allowing the standby boot-up code storage 12 to retain values even in the standby mode. Further, in the standby mode, power supply to the main controller 11 or the secure controller 21 may be interrupted.

Subsequently, when the standby boot-up of the ECU 901 is triggered by an event such as start of the engine (S109), power is supplied from the power controller 17 to the main controller 11 to cause the main controller 11 to execute the standby boot-up control code 111 stored in the standby boot-up code storage 12 (S110). The main controller 11 may execute the main control code 110 subsequent to S110 (S111).

Further, although not clearly shown in FIG. 2, the standby boot-up control code 111 may issue a code verification request to the secure controller 21 in a corresponding process. Code verification made by the secure controller 21 in response to the code verification request may have a verification range equivalent to the verification range in S103 and may be made in parallel with the execution of the standby boot-up control code 111 or the execution of the main control code 110 by the main controller 11.

Figure 3:
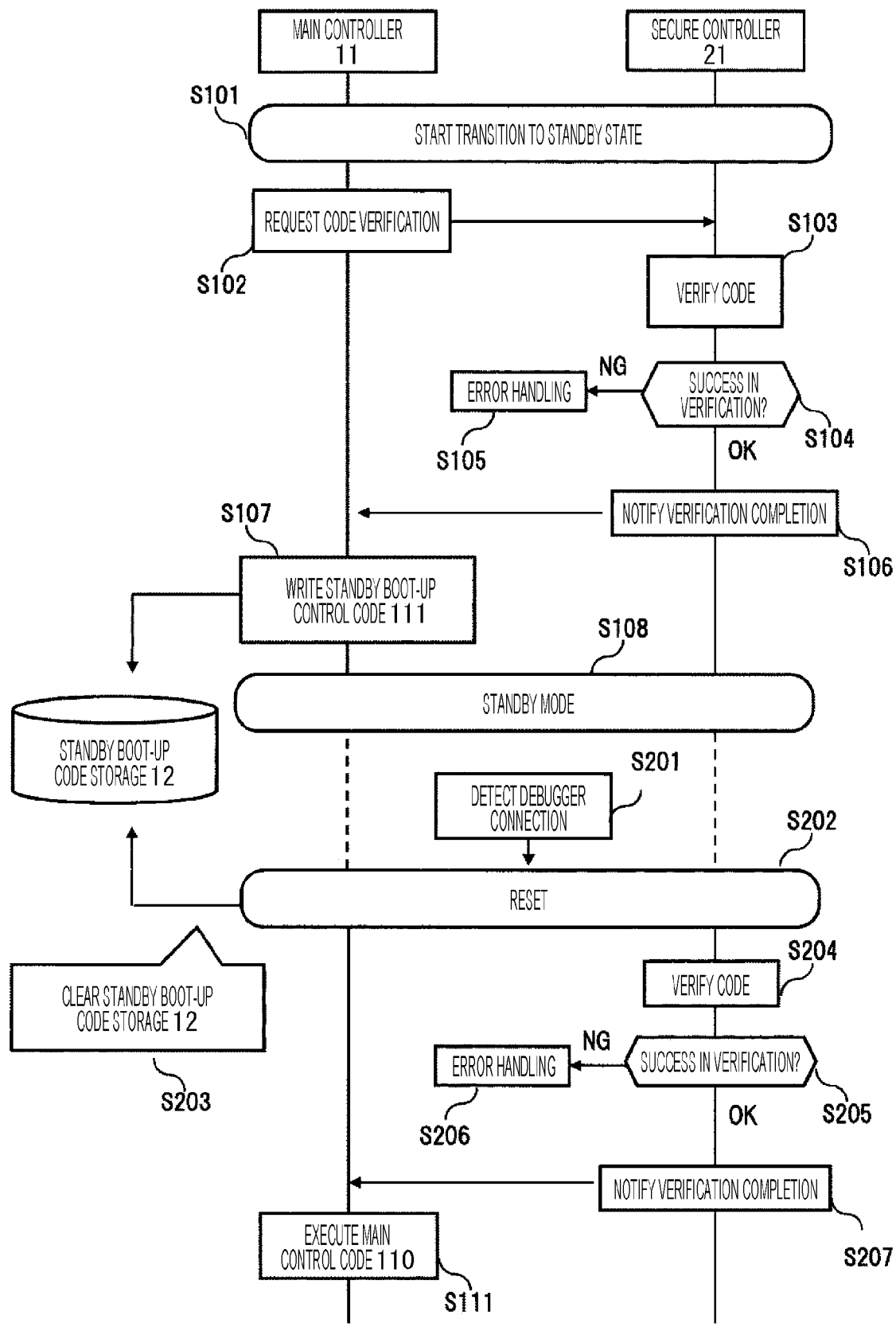
FIG. 3 is a flowchart of the security verification process according to the first embodiment.

FIG. 3 is a flowchart of the security verification process according to the first embodiment, showing a branch process of the flowchart described with reference to FIG. 2. Note that the security verification process according to FIG. 3 corresponds to a case where the ECU 901 in the standby mode is reset during the security verification process according to FIG. 2 and is equivalent in other configurations to a security verification process according to FIG. 2. Therefore, a description will be given mainly of differences from FIG. 2.

When, with the ECU 901 in the standby mode in S108, a debugger or the like is connected (S201), the debug port 18 and the power controller 17 cooperate with each other to trigger a reset (S202). At this time, the standby mode is canceled in response to the reset, and the standby boot-up code storage 12 is cleared accordingly (S203). In S203, when the standby boot-up code storage 12 is a non-volatile memory, an explicit rewriting process may be executed.

The ECU 901 booted in response to the reset after the standby mode is canceled causes the secure controller 21 to verify the control code stored in the main code storage 11 (S204). As in the relationship between S102 and S103, S204 may be executed in response to a code verification request from a trusted code of the main controller 11. When the code verification in S205 results in a failure (NO in S205), the secure controller 21 executes a predetermined error process (S206). When the code verification results in a success (YES in S205), the secure controller 21 notifies the main controller 11 of verification completion (S207). Subsequently, upon receipt of the notification of the completion of successful code verification, the main controller 11 proceeds to S111.

Note that the detection of the debugger connection in S201 is merely an example of the sequence, and any process flow may be employed as long as the reset operation is performed in S202. That is, when the reset is triggered in S202 by S201 or any event suspected of unauthorized tampering with the code of the ECU 901, S204 and subsequent processes are executed.

Such a configuration makes it possible to ensure security during fast boot-up from the standby mode while detecting unauthorized tampering with the code accompanied by the reset.

Note that when any error occurs during the execution of the steps described according to the present embodiment, the error may be notified to a controller of each component of a vehicle infotainment system.

Further, each of the programs included in the main control code 110, the standby boot-up control code 111, and the secure control code 210 may display, as necessary, information representing a corresponding process under execution on a display device. It is particularly desirable that each of the programs display information representing the completion of a series of processes or the occurrence of the branch process on the display device. Further, a determination in the branch process may be made by a user via an input device.

Furthermore, in the present embodiment, some step-to-step information exchanges are not shown. In practice, however, a command and response pair may be exchanged. Furthermore, even when each step-to-step information exchange is represented by a pair of bidirectional arrows, this exchange may include a plurality of commands and responses. Furthermore, even in a description of a case where data is transmitted and received between entities, in actual communication, one entity may serve as a client, and the other entity may serve as a server. In this case, the actual communication may be carried out using a command and a response, and as a result, the foregoing data may be transmitted.

Second Embodiment

A description will be given of a security verification process according to the second embodiment. Note that the security verification process according to the second embodiment is different from the security verification process according to the first embodiment only in the entity responsible for writing the standby boot-up control code 111 and is equivalent in other configurations to the security verification process according to the first embodiment. Therefore, a description will be given mainly of differences from the first embodiment.

Figure 4:
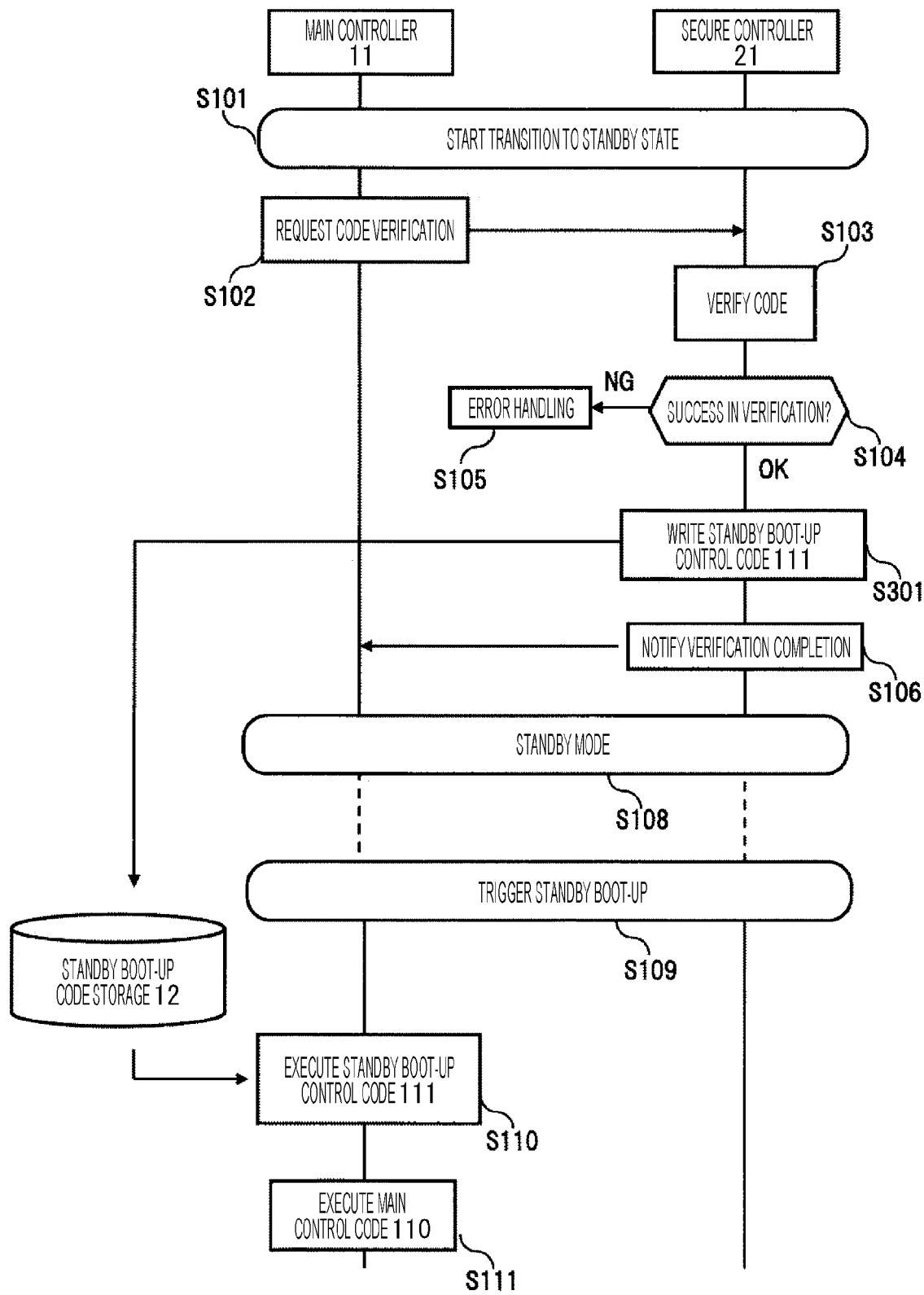
FIG. 4 is a flowchart of a security verification process according to a second embodiment.

FIG. 4 is a flowchart of the security verification process according to the second embodiment.

In FIG. 4, the secure controller 21 writes the standby boot-up control code 111 stored in the standby boot-up control code storage section 251 to the standby boot-up code storage 12 after S104 (YES), rather than S107 shown in FIG. 3 (S301). The secure controller 20 may copy, in advance, the standby boot-up control code 111 from the main code storage 11 to the standby boot-up control code storage section 251. Alternatively, the standby boot-up control code 111 may be retained, in a non-transitory manner, in the standby boot-up control code storage section 251. Subsequently, processes equivalent to the flow shown in FIG. 2 are executed.

According to the second embodiment, it is desirable that the standby boot-up code storage 12 be controlled to grant write permission only to the secure domain 2 and be controlled to grant only read permission to the main domain 1.

This configuration guarantees that the code in the standby boot-up code storage 12 which is read at standby boot-up is written only from the secure domain 2, thereby ensuring higher security during fast boot-up.

Third Embodiment

A description will be given of a security verification process according to the third embodiment. Note that the security verification process according to the third embodiment is different from the security verification process according to the first embodiment only in the method for determining whether security verification is necessary and is equivalent in other configurations to the reprogramming process according to the first embodiment. Therefore, a description will be given mainly of differences from the first embodiment.

Figure 5:
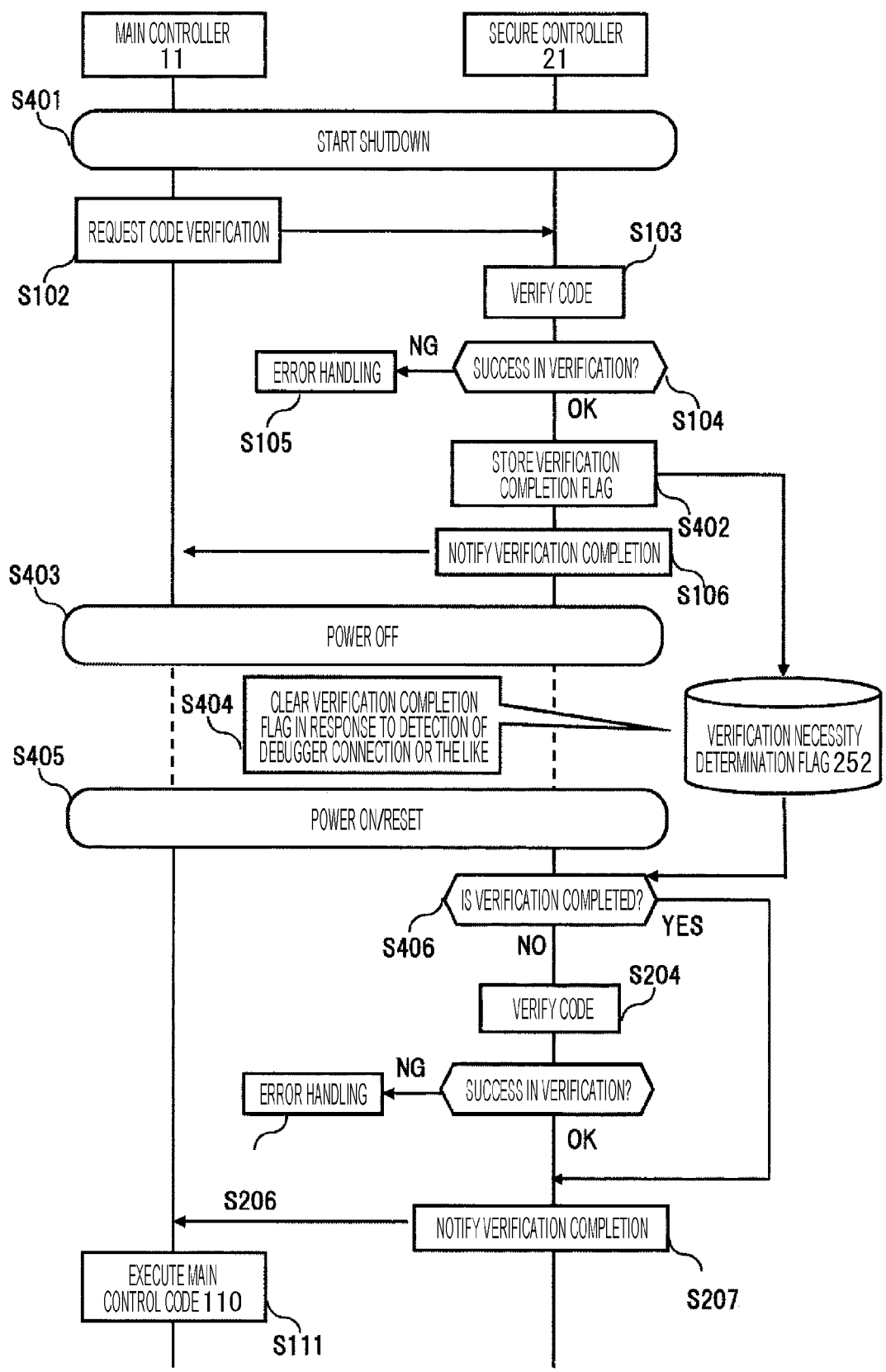
FIG. 5 is a flowchart of a security verification process according to a third embodiment.

FIG. 5 is a flowchart of the security verification process according to the third embodiment.

In FIG. 5, the sequence starts from a state where the ECU 901 starts a transition to shutdown (S401). As in the first and second embodiments, a transition to the standby state may be used as a trigger. Subsequent processes are executed in the same manner as in the second embodiment from S102 to S104 (YES), and then a verification completion flag is written to the verification necessity determination flag 252 in response to successful verification (S402). Thereafter, the ECU 901 makes a transition to a power-off state (S403). Alternatively, as in the first and second embodiments, the transition to the standby mode may be made.

When, with the ECU 901 in the power-off state in S403, the debugger or the like is connected (S404), the debug port 18 and the secure controller 21 cooperate with each other to clear the verification completion flag in the verification necessity determination flag 252.

When the ECU 901 is powered on or reset in response to the start of the engine or the like (S405), the secure controller 21 checks the verification necessity determination flag 252 and proceeds to S207 when the verification has been completed (YES in S406). When the verification has not been completed (NO in S406), the secure controller 21 proceeds to S204 to make the code verification. Here, the case where the verification has been completed corresponds to a case where a flag indicating verification completion is written to the verification necessity determination flag 252 in S402 before shutdown, and a process of clearing the flag indicating verification completion such as S404 has not been executed.

Note that the detection of the debugger connection in S404 is merely an example of the sequence, and any process flow may be employed as long as the verification completion flag is cleared in S404. That is, when the verification completion flag in the verification necessity determination flag 252 is cleared due to S404 or any event suspected of unauthorized tampering with the code of the ECU 901, S204 and subsequent processes are executed.

This configuration allows the secure controller 21 to determine whether the verification is necessary, thereby allowing not only the standby boot-up but also fast boot-up while ensuring security.

Note that the present invention is not limited to the above-described embodiments, and various modifications fall within the scope of the present invention. For example, the above-described embodiments have been described in detail to facilitate the understanding of the present invention, and the present invention is not necessarily limited to an embodiment having all the components described above. Further, some of the components of one embodiment may be replaced with corresponding components of another embodiment, and a component of another embodiment may be added to the components of one embodiment. Further, it is possible to add different components to the components of each embodiment, delete some of the components of each embodiment, and replace some of the components of each embodiment with different components.

Further, some or all of the components, functions, processing units, and processing means described above may be implemented by hardware such as an integrated circuit designed to implement some or all of the components, functions, processing units, and processing means. Further, each of the components and functions described above may be implemented by software that causes the processor to interpret and execute a program that makes each function work. Information such as a program, a table, and a file for making each function work may be stored in a storage device such as a memory, a hard disk, or a solid state drive (SSD), or in a recording medium such as an IC card, an SD card, or a DVD.

Further, control lines and information lines considered necessary for the description are only shown, and all the control lines and information lines necessary for the product are not necessarily shown. In practice, almost all the components may be mutually connected.

REFERENCE SIGNS LIST 1 main domain
2 secure domain
10 main controller
11 main code storage
12 standby boot-up code storage
15 main data storage
17 power controller
18 debug port
19 communication unit
20 secure controller
21 secure code storage
22 secure data storage
110 main control code
111 standby boot-up control code
210 secure control code
251 standby boot-up control code storage section
252 verification necessity determination flag
901 ECU

The invention claimed is:

1. An electronic control device installed on a mobile body, the electronic control device comprising:
  a main controller which controls a microcomputer using code;
  a secure controller communicably coupled with the main controller, which makes security verification of the code; and
  boot-up code which is part of the code and is executed when the microcomputer is booted, wherein
  the secure controller completes the security verification of the code or the boot-up code for next boot-up at a time of a transition of the microcomputer to a shutdown state, wherein
  the main controller enables, when the security verification of the code or the boot-up code has been successfully completed by the secure controller at the time of the transition, the boot-up code to be executed during next boot-up without the secure controller making a security verification of the code at the next boot-up; and wherein
  upon successful completion of the security verification of the code, the electronic control device transitions to a power-off state or to a standby state, and wherein
  the standby state of the microcomputer is a state requiring boot-up from the boot-up code, and
  the boot-up code is a standby boot-up code to be executed when the microcomputer is booted from the standby state, the electronic control device further comprising a standby boot-up code storage which stores the standby boot-up code, wherein
  the main controller stores, when the code or the standby boot-up code has been successfully verified by the secure controller at a time of a transition of the microcomputer to the standby state, the standby boot-up code into the standby boot-up code storage.

2. The electronic control device according to claim 1, wherein
  the secure controller enables, when the security verification of the code or the boot-up code has been successfully completed by the secure controller at the time of the transition, the boot-up code to be executed during next boot-up without the secure controller making the security verification of the code at the next boot-up.

3. A security verification method for an electronic control device including:
  a main controller which controls a microcomputer using code,
  a secure controller communicably coupled with the main controller, which makes security verification of the code,
  and boot-up code which is part of the code and is executed when the microcomputer is booted, the security verification method comprising:
  causing the secure controller to complete the security verification of the code or the boot-up code for next boot-up at a time of a transition of the microcomputer to a shutdown state,
  causing the main controller to enable, when the security verification of the code or the boot-up code has been successfully completed by the secure controller at the time of the transition, the boot-up code to be executed during next boot-up without the secure controller making the security verification of the code at the next boot-up;
  upon successful completion of the security verification of the code, transitioning the electronic control device to a power-off state or to a standby state; and wherein
  the standby state of the microcomputer is a state requiring boot-up from the boot-up code, and
  the boot-up code is a standby boot-up code to be executed when the microcomputer is booted from the standby state, the electronic control device further comprising a standby boot-up code storage which stores the standby boot-up code, and
  storing, when the code or the standby boot-up code has been successfully verified by the secure controller at a time of a transition of the microcomputer to the standby state, the standby boot-up code into the standby boot-up code storage.

* * * * *